(12) United States Patent
Karasch

(10) Patent No.: US 9,885,010 B2
(45) Date of Patent: Feb. 6, 2018

(54) APPARATUS AND METHOD FOR AGING LIQUIDS

(71) Applicant: Russell D. Karasch, Osage, MN (US)

(72) Inventor: Russell D. Karasch, Osage, MN (US)

(*) Notice: Subject to any disclaimer, the term of this patent is extended or adjusted under 35 U.S.C. 154(b) by 0 days.

(21) Appl. No.: 14/545,667

(22) Filed: Jun. 5, 2015

(65) Prior Publication Data

US 2017/0327778 A1 Nov. 16, 2017

(51) Int. Cl.
*C12H 1/22* (2006.01)
*C12G 3/07* (2006.01)

(52) U.S. Cl.
CPC .............. *C12H 1/22* (2013.01); *C12G 3/065* (2013.01)

(58) Field of Classification Search
CPC . C12G 3/065; C12H 1/22; B65D 9/04; B65D 9/30
USPC .... 220/4.09, 209, 265, 790, 592.19, 592.16, 220/4.04, 4.07; 217/76, 80, 81, 96, 97, 217/77, 3 C; 99/277.1, 277.2; 426/86, 426/330.9
See application file for complete search history.

(56) References Cited

U.S. PATENT DOCUMENTS

| 273,860 | A | | 3/1883 | Lachenmeyer |
|---|---|---|---|---|
| 334,222 | A | | 1/1886 | Fitch |
| 429,826 | A | | 6/1890 | Wagoner |
| 818,478 | A | | 4/1906 | Shwayder |
| 1,919,091 | A | | 10/1934 | Pritchett |
| 2,017,235 | A | * | 10/1935 | Drew ..................... C12G 3/065 99/277.1 |
| 2,064,330 | A | | 12/1936 | Yocum |
| 2,079,378 | A | | 5/1937 | Mills |
| 2,086,073 | A | | 7/1937 | Francescon |
| 2,105,693 | A | | 1/1938 | Jones et al. |
| 2,108,661 | A | | 2/1938 | Farrier |
| 2,114,009 | A | | 4/1938 | Ramsay |
| 2,195,662 | A | | 4/1940 | Van Sant |
| 2,203,229 | A | | 6/1940 | Nilsson et al. |
| 2,289,245 | A | | 7/1942 | Dant |
| 2,487,594 | A | | 11/1949 | Rudnick |
| 2,876,692 | A | | 3/1959 | Galsman |
| 3,106,885 | A | * | 10/1963 | Kelley ..................... C12H 1/22 99/277.1 |
| 3,372,633 | A | | 3/1968 | Horlander, Jr. |
| 3,456,827 | A | * | 7/1969 | Wakeem ................. B65D 9/04 217/72 |
| 3,462,038 | A | | 8/1969 | Morris |

(Continued)

OTHER PUBLICATIONS

Fine Northern Oak website: www.finenorthernoak.com.

*Primary Examiner* — Shawn M Braden
(74) *Attorney, Agent, or Firm* — Gregor N. Neff

(57) ABSTRACT

A rectangular or cylindrical container made of stainless steel or another liquid-impervious material has a plurality of openings formed in the side wall(s). Wooden boards, made of scarce white oak or other wood used for aging and flavoring beverages, are fitted into the openings and sealed so that their inside surfaces contact the liquid in the container. The inside surfaces have cross-grain cuts such as saw cuts or holes, which are used to enhance the infusion of beverage liquid into the wood to age the beverage rapidly and flavorfully. When one batch is finished, the used boards are removed and new ones are fitted into the openings and used to treat another batch. Thus, the use of wood, which can be scarce and expensive, is minimized.

14 Claims, 4 Drawing Sheets

(56) References Cited

U.S. PATENT DOCUMENTS

| | | |
|---|---|---|
| 3,842,723 A | 10/1974 | Boucher |
| 3,942,423 A | 3/1976 | Herzfeld |
| 4,093,099 A | 6/1978 | Spooner |
| 4,173,656 A | 11/1979 | Duggins |
| 4,322,446 A | 3/1982 | Heess et al. |
| 4,449,886 A * | 5/1984 | Kalua .................... C12G 1/062 366/219 |
| 4,484,688 A | 11/1984 | Smith |
| 4,558,639 A | 12/1985 | Hojnoski |
| 4,703,866 A | 11/1987 | Scott |
| 4,953,730 A * | 9/1990 | Prime ...................... C12H 1/22 217/13 |
| 5,054,381 A | 10/1991 | DePeaux et al. |
| 5,102,675 A | 4/1992 | Howell et al. |
| 5,174,461 A | 12/1992 | Sullivan |
| 5,481,960 A | 1/1996 | Sullivan |
| 5,537,913 A | 7/1996 | Vowles |
| D372,624 S | 8/1996 | Chein |
| 5,647,268 A | 7/1997 | Sullivan |
| D422,678 S | 4/2000 | King |
| 6,203,836 B1 | 3/2001 | Gross, II et al. |
| 6,378,419 B1 | 4/2002 | Eckleln |
| D476,058 S | 6/2003 | Norton |
| D506,109 S | 6/2005 | Deal et al. |
| 6,966,250 B2 | 11/2005 | Eustis |
| 7,357,069 B1 | 4/2008 | Karasch et al. |
| D584,564 S | 1/2009 | Karasch |
| 7,594,468 B2 | 9/2009 | Kania et al. |
| 7,866,254 B1 | 1/2011 | Karasch et al. |
| 8,889,206 B2 | 11/2014 | Lix |
| 2003/0157216 A1 | 8/2003 | Plumb |
| 2005/0031760 A1 | 2/2005 | Plumb |
| 2007/0000929 A1 * | 1/2007 | Fernandez ............... C12H 1/22 220/565 |
| 2010/0025396 A1 * | 2/2010 | Boake .................... B65D 15/16 220/4.09 |

* cited by examiner

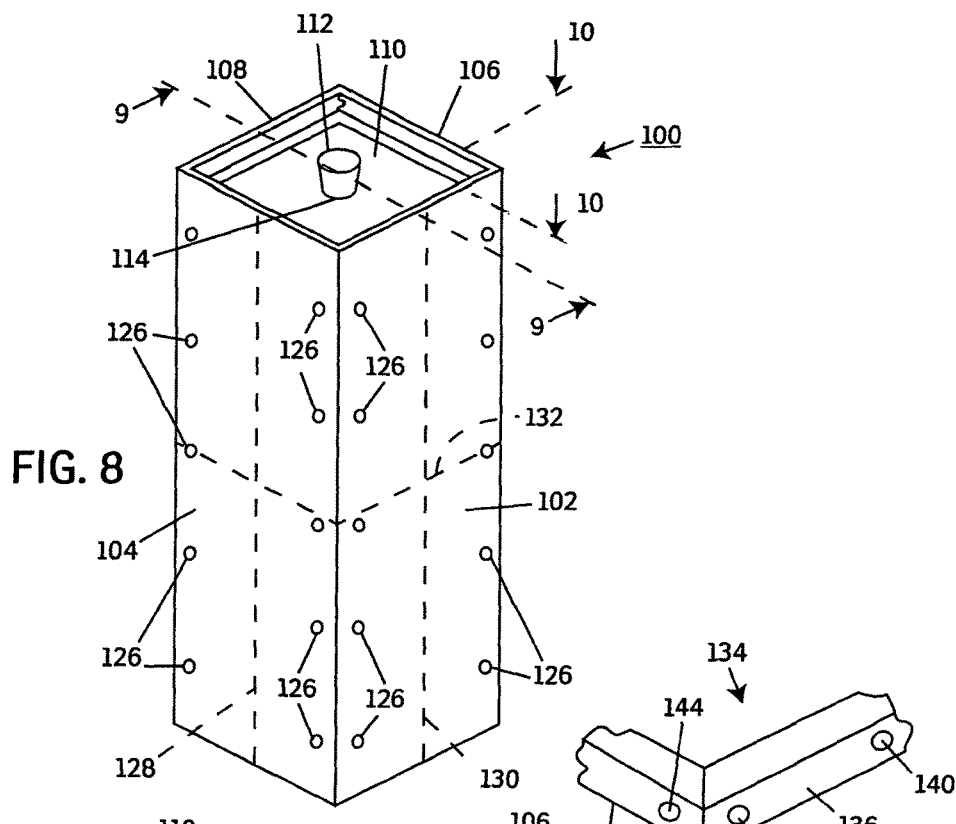
FIG. 8
FIG. 12
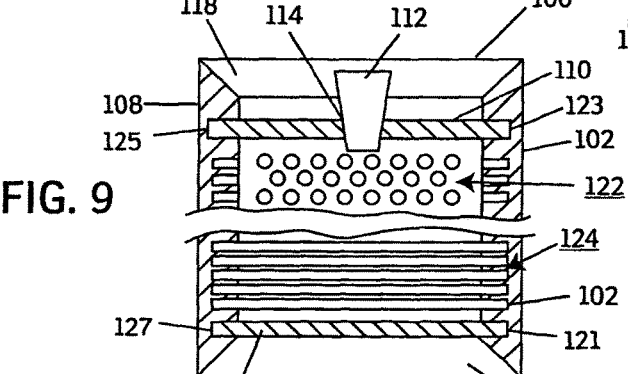
FIG. 9
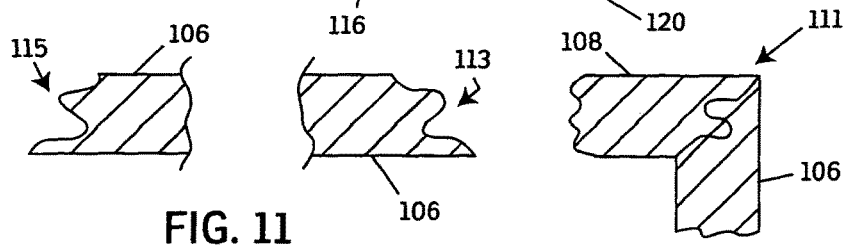
FIG. 11
FIG. 10

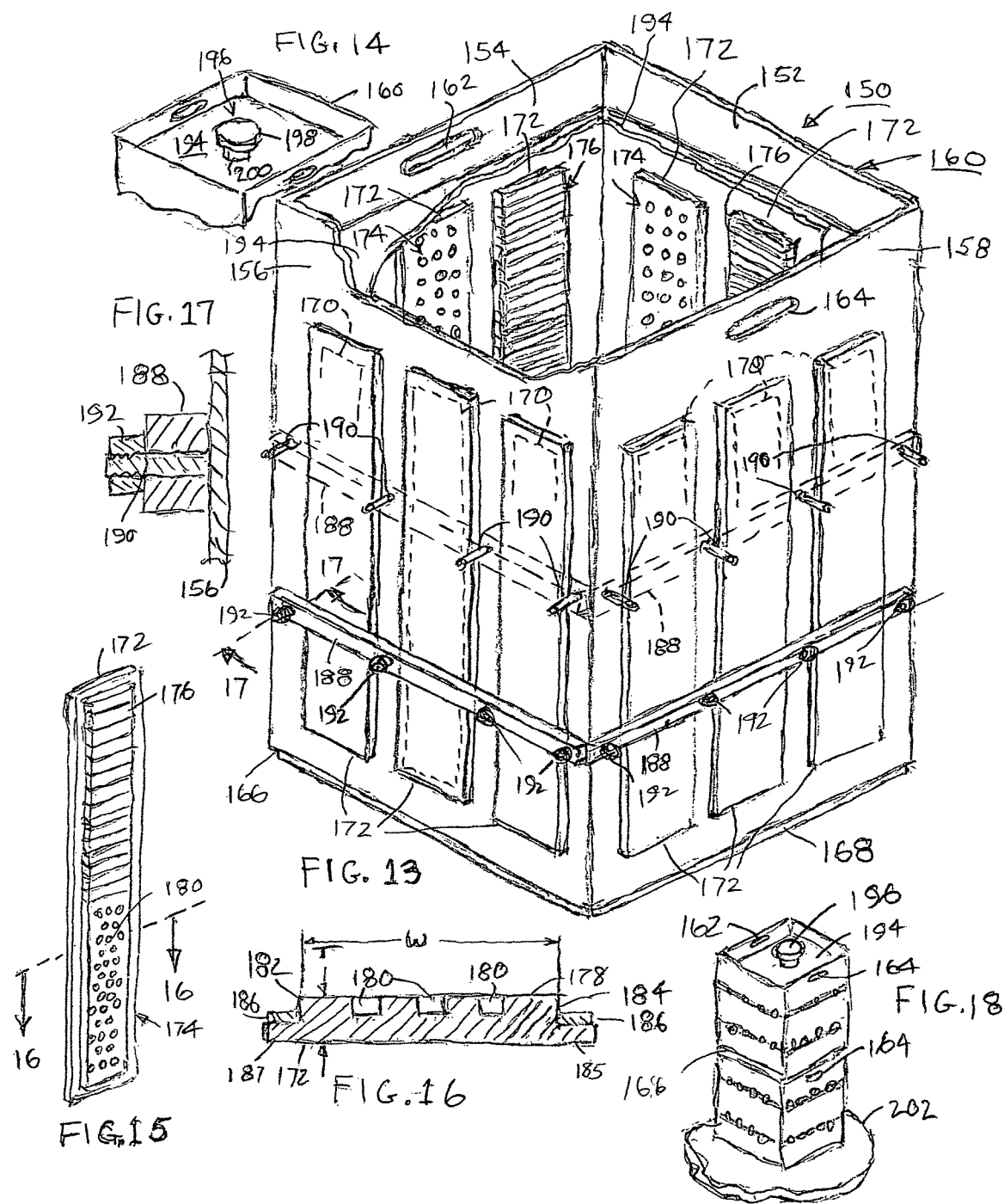

APPARATUS AND METHOD FOR AGING LIQUIDS

This patent application is a continuation-in-part of U.S. patent application Ser. No. 14/225,992, filed Mar. 26, 2014, which claims priority from U.S. patent application Ser. No. 13/065,944, filed Apr. 1, 2011, which claims priority from Provisional Patent Application Ser. No. 61/343,510, filed Apr. 30, 2010.

This invention relates to the aging of liquids such as wine, spirits, beer, and other liquids, syrups, and the like, whose flavors are enhanced by aging in wood.

Many proposals have been made in the past for aging liquids in wood. The main problem addressed by such prior proposals, and by this invention as well, is the very slow speed at which aging in oaken barrels takes place. Often, it takes years of aging to create a whiskey, wine, or other spirituous liquid with the right flavor characteristics. This is very expensive because of the capital tied up in barrels, storage space, and evaporation of the liquid.

Therefore, there have been many attempts to provide apparatus and methods to accelerate the aging process. In one prior approach, wood is cut into small cubes or shavings, etc. and placed in a bag or other porous container which then is inserted into the liquid. This requires cutting the wood, bagging it, and the cost of bags. It has other disadvantages which will be set forth below.

Other prior aging processes and apparatus include the formation of vertical grooves or indentations in the staves of a wooden barrel to increase the surface contact area of the barrel. This is believed to produce an only modest improvement, at best.

Other prior devices use structures such as wooden discs or spiral-cut wooden pieces to be inserted into the liquid to increase the wood surface area and accelerate aging.

Although some of the prior proposals have achieved some success, none has achieved the ultimate in aging speed, quality of the aged liquid, and cost-effectiveness.

Therefore, it is an object of the present invention to provide liquid-aging apparatus and method which alleviates or overcomes the foregoing problems.

It is a further objective to provide a liquid-aging process and apparatus which age liquids rapidly and economically, while achieving good taste characteristics.

It is a further object of the invention to provide such apparatus and methods which are relatively simple and economical to manufacture and use.

In accordance with the present invention, a wooden member is provided inside a container for containing the liquid. The wooden member has a plurality of holes formed across the grain of the wood in a honeycomb pattern.

In such a pattern, the holes are arranged in rows and columns, with alternating rows being offset laterally from the adjacent rows. The holes are relatively close together with spacing between them of less than one diameter of the holes.

The wooden member can be provided in different forms.

One form is in one or more of the staves or panels making up a wooden barrel. The holes are drilled less than all the way through the staves so as to preserve the integrity of the barrel for holding liquids without leakage.

Another form for the wooden member is an elongated member or "stick" which can be inserted into an opening in a barrel or other container and suspended in the liquid in the container to provide aging. The stick can be attached to a bung cover for the bung hole in a barrel, or otherwise secured to the container to hold it in suspension in the liquid. If needed, multiple sticks can be connected together in series to increase the effective aging area of the wood in the liquid.

In addition, staves of the barrel and/or the wood sticks can be cut crosswise of the grain of the wood with multiple parallel cuts to expose more end grain of the wood to the liquid to further increase the rate of infusion of the liquid into the wood.

In an alternative embodiment of the invention, a wooden barrel is made, in the usual way, by bending staves and binding them at the top and bottom so as to produce a barrel with a midsection of larger diameter than at the ends. Then, a spiral groove is cut across the grain of the successive panels, on the inside of the barrel, so as to form, in effect, multiple cross-grain cuts in a continuous spiral form over a substantial height of the barrel's inner surface to provide enhanced aging.

When using the invention for aging liquids, the number of staves with holes in them needed in a wooden barrel to give a desired aging rate is determined, and barrels are then built with the number of such panels deemed to be needed to achieve the aging objectives.

The pitch and length of the spiral groove also can be selected to give the desired aging characteristics.

Similarly, the number and size of the aging sticks to be used is determined, and that number is inserted through the bung hole or opening in the aging container, the liquid is introduced into the container, and aging is allowed to proceed for a desired length of time.

Another problem with which this invention is concerned is caused by the shape and the construction of the standard oak barrel used for aging spirituous liquids. Such barrels, with their many staves bent outwardly in the middle, and their metal hoops are expensive to make and require substantial amounts of warehouse space for storage while the liquids are aging in the barrels.

Furthermore, the standard barrels are relatively difficult to handle because of their shape.

The foregoing problems have been recognized for a very long time, but have not been solved satisfactorily.

One frequently suggested solution is to make the barrels rectangular in shape instead of round with bulging sides. However, this suggestion has met with little or no success, for a variety of reasons.

Accordingly, it is another object of this invention to provide an aging container of generally rectangular shape which has straight, flat sides and is relatively easy to move on standard pallets, requires relatively much less storage space than standard barrels, and costs substantially less to manufacture.

In accordance with the present invention, the latter objects are met by the provision of a liquid beverage aging container which has straight, flat sides, and preferably is rectangular in shape, while being relatively low in manufacturing cost. One or more internal surfaces of the side walls of the container has an array of cross-grain cuts such as those provided herein for slats of standard barrels so as to greatly accelerate and enhance the aging of beverages in the containers, and aiding in keeping manufacturing costs relatively low.

The cross-grain cuts preferably are straight cuts or arrays of holes extending partway through wood of the sidewall panels to thus expose the liquid to the grain of the wood to achieve the accelerated aging and desired taste effect on the liquid.

One embodiment of the invention comprises a single board for each of four sides of the container, with the edges being beveled and having a tongue-and-groove construction which fits the beveled edges together and forms a good liquid seal. Preferably, the sides of the container are held together by simply driving stainless steel screws through both board edges at each corner joint.

Because it is anticipated that the liquid being aged will spend a relatively short time in the container, it is believed that flat-sawed white oak can be used instead of the much more expensive quarter-sawed white oak.

If a larger size of the rectangular container is needed, multiple boards can be joined edge-to-edge to form each flat side panel. If necessary, a brace structure can be applied around the outside of the container and fastened to the side walls to hold them firmly in place.

Another problem addressed by the present invention is that there is a shortage of certain woods such as white oak used in beverage storage and aging. Also, when the wood is available, it is relatively expensive.

Therefore, it is a further object of the invention to minimize the amount of wood needed for a storage and aging container in order to quickly and properly store and age beverages.

Accordingly, a storage and aging container is provided that has a stainless steel, plastic or other liquid-impervious structure with holes in the side-wall(s) and wooden boards fitted into the holes and held and sealed in place so that only the inner surface of each board is exposed to the liquid in the container. The inner surface of each board has a predetermined number, size and type of cross-grain cuts needed to age the beverage to be stored in the container.

When one batch of beverage has been aged, the used boards are removed and replaced with new boards. Therefore, only relatively small amounts of relatively small pieces of wood are used, thus saving wood and the cost of replacing the whole barrel.

The foregoing and other objects and advantages of the invention will be set forth in or apparent from the following specification and drawings.

IN THE DRAWINGS

FIG. 8 is a perspective view of another embodiment of the aging container of the present invention;

FIG. 9 is a cross-sectional view, partially schematic, partially broken-away, taken along line 9-9 of FIG. 8;

FIG. 10 is a partially broken-away enlarged cross-sectional view taken along line 10-10 of FIG. 8;

FIG. 11 is an enlarged, partially broken-away cross-sectional view of one of the side panels of the container shown in FIG. 8; and FIG. 12 is a broken-away, partially schematic view of a bracing structure used for another embodiment of the container of FIG. 8.

FIG. 13 is a perspective, partially broken-away view of another embodiment of the invention;

FIG. 14 is a perspective view, with the bottom broken away, of the top of the structure shown in FIG. 13;

FIG. 15 is a perspective view of a component of the FIG. 13 structure;

FIG. 16 is a cross-sectional view, taken along line 16-16 of FIG. 15;

FIG. 17 is a cross-sectional view taken along line 17-17 of FIG. 13; and

FIG. 18 is a perspective, partially-schematic view of two of the containers of FIG. 13 stacked one on top of the other for compact storage.

BARREL STAVE EMBODIMENT

Figure 1:
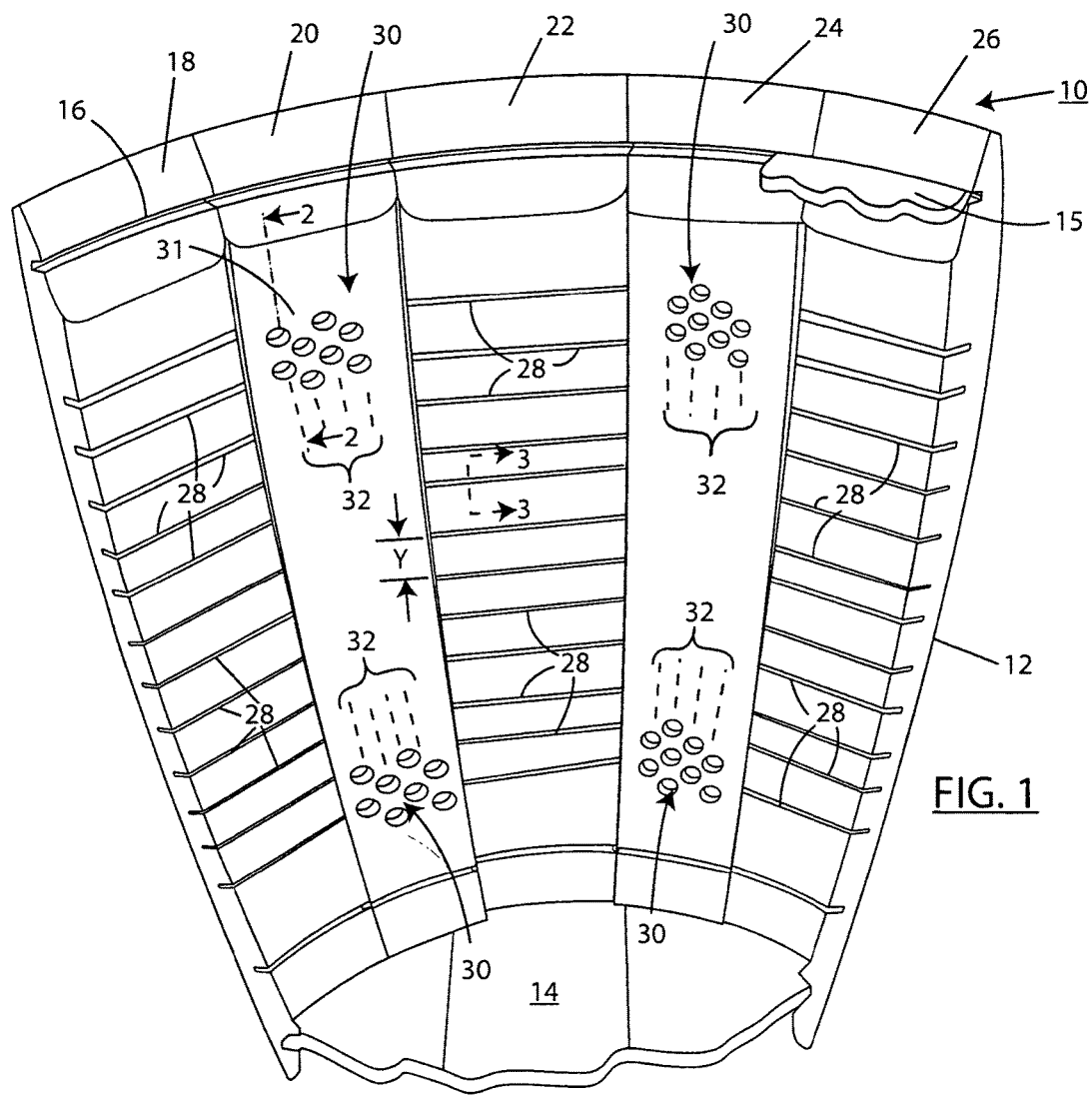
FIG. 1 is a perspective view, taken from above, of a portion of a wooden barrel using the invention.

FIG. 1 shows a portion of a wooden barrel 10 such as that commonly used for aging spirits, wine, beer, or the like. The barrel 10 has a plurality of vertical panels called "staves" 18, 20, 22, 24 and 26, forming a side wall 12.

A wooden bottom wall 14 is in position joining the bottom of the staves together, and a wooden top cover 15 fits into the groove 16 formed in the staves to close the barrel tightly at the top. There is a bung-hole (not shown), in the side wall 12.

The remaining staves, the top panel and hoops forming the complete barrel are not shown, for the purpose of clarity in the drawings.

Typically, the wooden barrel is made of white oak, which has the capability of storing liquids for long periods of time with little or no leakage, while also aging the liquids.

The inside surfaces of the staves normally are fairly smooth. However, in accordance with the invention, selected ones of the staves such as staves 20 and 24 are provided with arrays 30 of holes formed in the inner surfaces of the staves. The arrays of holes are used to enhance aging of liquid stored in the barrel.

Other staves such as staves 18, 22 and 26 do not have the holes in them, but instead have horizontal cross-grain grooves or cuts 28 to provide additional aging capability.

It should be understood that the arrays of holes 30 normally will extend the full length of each stave. However, only parts of the arrays have been shown in FIG. 1 so as to simplify the drawings.

It is not necessary to provide arrays which extend essentially the full length of the staves, because an array of holes of a shorter length may adequately serve the objectives of the invention.

Similarly, the array of horizontal cuts 28 need not extend the full length of the staves as shown in FIG. 1, if the added aging capability of a full-length array is not needed.

The holes in the arrays 30 are arranged in what is called a "honeycomb" pattern, which will be described in greater detail below.

Figure 2:
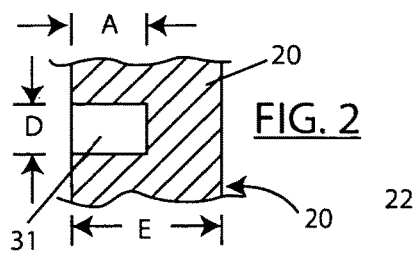
FIG. 2 is a cross-sectional, broken-away view, taken along line 2-2 of FIG. 1.

As it is shown in FIG. 2, the holes such as the individual hole 31 in the stave 20 has a depth A which is substantially less than the full thickness E of the stave. Thus, substantial wood material is left to preserve the integrity of the barrel wall in retaining the liquid in it. In a white oak stave, the thickness E of the wood typically is around 1¼ inches and the depth A of the holes is about ⅝ of an inch, half of the stave thickness. Typically, the diameter D of the holes is around 3/16 of an inch, for staves of a standard size.

Figure 3:
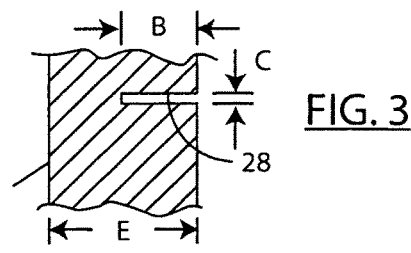
FIG. 3 is a cross-sectional, broken-away view taken along Line 3-3 of FIG. 1.

As shown in FIG. 3, the cross cuts 28 in the staves 22, and in the staves 18 and 26, extend substantially less than the full thickness of the staves so as to maintain adequate structural integrity. Typically, with staves whose thickness is 1¼", the depth B of each cut 28 is around ⅝", again, around half of the stave thickness. Preferably, the width C of the slot 28 is kept relatively small so as to minimize the amount of wood removed from the stave. Typically, the width C varies between approximately 0.05" and approximately 0.25". Preferably, the width C is approximately 0.10".

The vertical spacing Y (FIG. 1) between horizontal cuts 28 is sufficient to insure that the area of wood between adjacent cuts will not break off when the staves are bent to form the barrel. This distance has been found to be approximately ¾" or greater.

Hole Pattern

Figure 4:
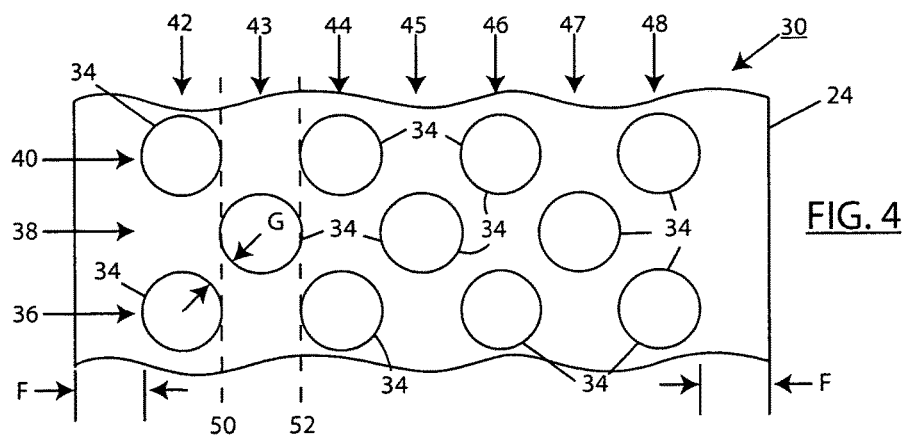
FIG. 4 is an enlarged side elevation view of a portion of one of the staves of the barrel shown in FIG. 1.

FIG. 4 shows an enlarged section of one of the staves 24 which has an array 30 of holes 34 which are arranged in a honeycomb pattern.

The holes 34 are arranged in parallel rows, 36, 38 and 40, spaced vertically by equal distances from one another, and aligned across the grain of the wood which runs vertically in FIGS. 1 through 4.

The holes 34 also are arranged in vertical columns 42-48, which also are spaced equally from one another.

Alternate rows, such as the row 38, are offset laterally from the holes in the adjacent rows 36 and 40. The columns of holes are spaced inwardly from the side edges of the staves 24 by a distance F, sufficient to prevent splintering.

The columns of holes are spaced midway between adjacent holes in each of the rows. The holes are spaced as closely together as possible without unduly weakening the wooden stave. To this end, the spacing G between adjacent holes is preferably kept below the diameter of each hole, and more preferably, less than one half of that diameter.

This "honeycomb" arrangement of the holes tends to increase the number of holes which can be positioned in a given surface area without fatally compromising the structural strength of the stave.

One of the large advantages of providing the holes in the stave is that it greatly increases the exposure of the end grain of the wood to the liquid in the container. It is believed that the liquid infuses into the wood in the end grain many times faster than it is absorbed into the side grain of the wood, which is formed by vertical xylem and phloem tubes which carry the nutrients and other liquids in the living tree. The end grain of the wood is well-exposed.

In order to maximize the absorption of liquid, the holes in adjacent vertical columns, such as columns 42, 43 and 44, are aligned vertically so that a vertical line 50 or 52 drawn through the left or right edge of each of the holes 34 is slightly overlapped by each of the holes. That is, each of the holes overlaps the vertical alignment line such as 50 or 52 by a small amount, say, 0.002" (two thousandths of an inch).

With this arrangement, a liquid in the container is absorbed into the wood sections between the holes very thoroughly in a relatively short amount of time. This greatly increases the infusion rate of the liquid into the wood and greatly increases the rate of aging.

Aging Stick

Figure 5:
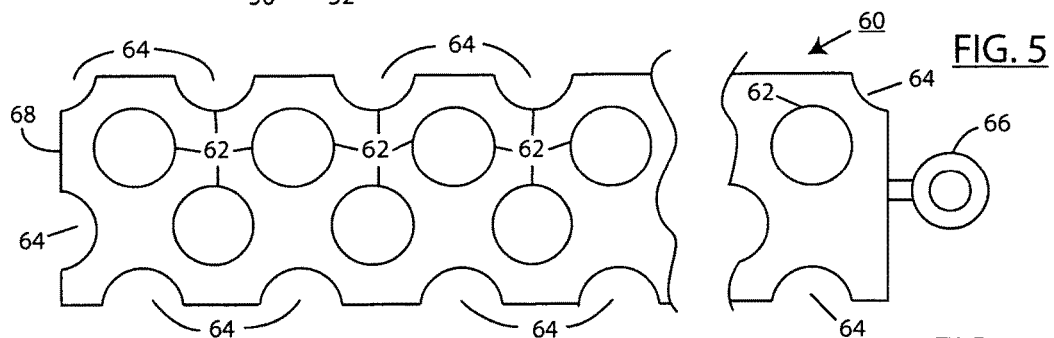
FIG. 5 is a top plan view, partially broken-away, of a wooden member used as an "aging stick" in another embodiment of the invention.
Figure 6:
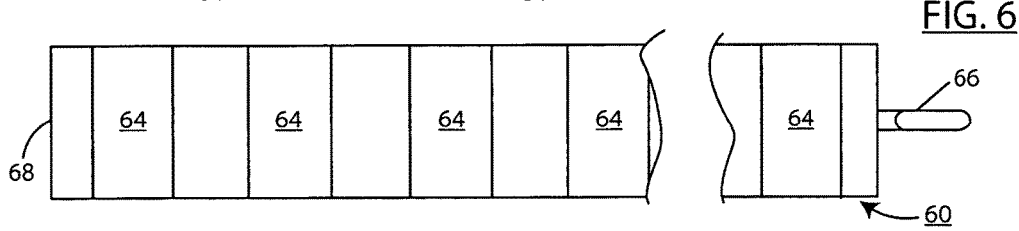
FIG. 6 is a side elevation view of the structure shown in FIG. 5.

FIGS. 5 and 6 show an elongated wooden member 60 which is called an "aging stick." The wooden member 60 usually is much longer than shown in FIGS. 5 and 6, but is broken-away in order to fit the drawing into the available space.

Preferably, the maximum width dimension of the stick 60 is made small enough to enable the stick to fit through an opening in an aging container, into which it is to be inserted. Often, this is a bung hole in a barrel. Typically, the bung hole of a barrel has a diameter between 1⅛" and 2". Therefore, the maximum width dimension of the stick 60 will be a little less than 1⅛" or 2", depending upon the bung hole diameter through which it is to pass.

An eye-screw 66 is fastened in the right end of the stick 60 to enable it to be attached to a bung hole cover or other structure provided in the container for attaching it. Also, similar fasteners can be provided at the opposite end 68 to be used to attach the sticks 60 together end-to-end in a series arrangement, where more than one stick is needed.

The stick 60 has the same hole pattern as that shown in FIGS. 4 and 1, namely, a "honeycomb" pattern. The holes in the stick are shown at 62. Partial holes are shown at 64 on both edges and at the ends of the stick. These partial holes are formed by the manufacturing process used to make the sticks, in which a large panel has holes formed in it, and then the panels are cut parallel to the rows or columns or holes into square cross-section blocks such as that shown in FIGS. 5 and 6, with the cuts sometimes being made along center lines of rows of holes.

In this case, unlike that of the panels 20 and 24, of FIG. 1, the holes 62 are drilled completely through the wood of the member 60. This gives maximum exposure of the end grain of the wood in the holes to the liquid being aged.

Manufacturing Process

The holes 32 or 62 can be made accurately, in a relatively small amount of time, and at a relatively low cost.

For example, the holes can be formed by a programmed CNC machine with multiple router bits. The CNC machine is programmed to cut all of the holes in the accurate pattern shown in FIG. 4, either to the depth A shown in FIG. 2, or all the way through as shown in FIGS. 5 and 6.

The cuts 28 can be formed by multiple passes of radial arm or other saws, with either single or ganged saw blades.

Preferably, the holes 34 in the staves, shown in FIG. 1 are drilled, and the cuts 28 are made, before the staves are bent to form the barrel, that is, when the staves still are relatively straight pieces of wood. This greatly facilitates the automated formation of the holes and grooves.

The provision of the holes 34 and cuts 28 in the staves greatly increases the exposed end grain of the wood to greatly increase the absorption of liquid in the infusion process, without fatally reducing the strength of the staves.

In the process of finishing a barrel made using the present invention, the wood of the barrel (and of an aging stick, if desired) can be "toasted" or charred as needed or desired for the purpose at hand. Normally, wine barrels are toasted and barrels for aging spirits are charred.

An especially desirable character is given to the material of the barrel if it is first toasted, for say, about 45 minutes or so, at a relatively low temperature, to give the wood a light brown color, and then charred with a flame applied to it at a very high temperature for a very short time, so as to produce a two-step charred surface.

Helical Stave Cuts

Figure 7:
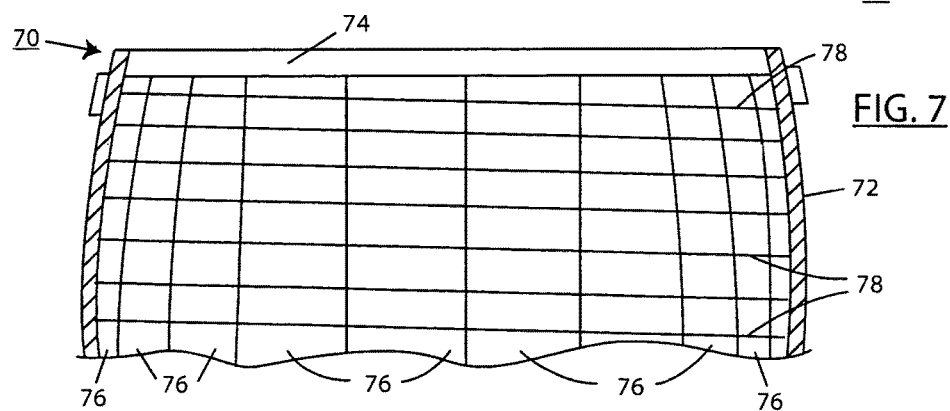
FIG. 7 is a broken-away cross-sectional view of a portion of a wooden barrel using another embodiment of the invention.

FIG. 7 is a cross-sectional view of the top portion of a barrel which has been modified in accordance with another embodiment of the present invention. The barrel 70 has an upper edge 74, staves 76 bound together by hoops to form a side wall 72, and top and bottom walls (not shown).

In accordance with this further embodiment of the invention, one or more helical or spiral cross-grain cuts 78 are formed on the inner walls of the staves 76 completely around the inside of the barrel after the barrel has been assembled. This forms, in effect, a plurality of lands for each helical cut, which are formed by almost horizontal grooves in the staves. Each of the grooves exposes a significant amount of additional end grain to improve the aging of liquid contained in the barrel.

The helical groove or grooves 78 can be formed by hand, but preferably are formed by one or two circular saws on radial arms mounted on a central helical guide. The saws move on the helical guide upwardly and downwardly in the barrel, and the radial arm is spring-loaded to automatically change its effective length to accommodate the differing radii of the barrel at differing heights. The spring loading presses the saw blade(s) against the staves to make saw cuts forming helical grooves 78 with the right depth. Preferably, the grooves are of the depth and width like that of the grooves 28 formed in the staves 18, 22 and 26 of the barrel shown in FIG. 1, and as illustrated in FIG. 3.

Multiple different helical saw cuts can be made, and the vertical height of the helical grooves can be varied to produce a variable amount of acceleration of liquid infusion.

This method of producing extra end-grain exposure has the advantage that forming the cross-grain cuts after assembly of the barrel will largely prevent the breaking off of pieces of the inner surfaces of the staves when the staves are bent to form the barrel. This allows the lands of the groove 78 to be closer together than the cuts 28 shown in FIG. 1, if desired.

Method of Use

In using the invention, it is determined how fast the liquid is to be aged. Preferably, this is determined empirically by trial and error with each different kind of liquid to be aged. This is desirable to assure that the aging process does not proceed too quickly. This is therefore going to be a factor in determining the number of staves like the holed staves 20 and 24 shown in FIG. 1 to be used, and the characteristics of other staves which may have horizontal cuts, or the length and pitch of the helical groove 78 cut in the barrel shown in FIG. 7.

Then the barrel is made with the requisite number of hole-bearing, or cross-cut, or spiral-cut staves, and then the liquid to be aged is placed in the container and held for the requisite amount of time, with periodic testing to ensure good characteristics of the liquid.

Similarly, where aging sticks are used instead, or in addition to hole-bearing and groove-bearing staves, the number of sticks used in a given container is determined, and the proper number is inserted into liquid in the aging container, and held there for a desired length of time.

Although the aging stick 60 shown in FIGS. 5 and 6 can be made of the same wood (usually white oak) as the staves of the barrel, the wood can be any other type of wood desired to give a particular flavor, aroma, or other desirable characteristic to the liquid being aged. Thus, a combination of different flavors can be infused into the liquid using a combination of ordinary staves, or holed or grooved staves and aging sticks.

The present invention has a number of different advantages. First, the total wood surface area available for absorbing and aging liquids is increased significantly, thus increasing the speed of aging.

Significantly, each of the holes or cuts in the wood produces an increase in the amount of wood end grain exposed to the liquid.

It is advantageous that small wood pieces need not be prepared, loaded into bags or other porous containers. Moreover, porous containers are not needed at all. This cuts down on labor and materials costs.

The use of the invention has the further advantage that the quality of the wood used for aging the liquid is readily apparent. The staves easily are visible and the wood in the aging sticks also is clearly visible. This is unlike bags of wood cubes and chips in which knots, sap wood or pith can be included, without the knowledge of the distiller, vintner or brewer, because they are hidden from view.

The use of the aging sticks makes it possible to add sticks to barrels or any other type of container desired, and makes it possible to supply large planks to fit into long stainless steel tanks, carboys, or other large containers.

Although the hole arrays and grooves have been described as being formed in the side walls of a wooden barrel, it should be understood that it is within the scope of the invention to form such holes and/or grooves in the wooden end panels of a wooden barrel, or another kind of a barrel with wooden ends or wooden internal structure. This can be done in addition to, or instead of, forming hole arrays or grooves in the staves of barrels.

Rectangular Aging Container

FIG. 8 shows another embodiment of the aging container of the present invention. Advantageously, the container 100 is generally rectangular in shape, that is, it has the shape of a rectangular parallelepiped with a square horizontal cross-section, and four rectangular sides.

The container 100 has four vertical side walls 102, 104, 106 and 108 which are joined together at their edges to form a walled enclosure. Two additional panels, a top wall 110 and a bottom wall 116 (FIG. 9) are fitted into grooves near the top and the bottom, respectively of the walled enclosure. This forms a liquid-tight enclosure for holding and aging liquids.

A bung hole 114 (FIG. 9) is provided in the top wall 110 and a tapered bung 112 is fitted into the hole to seal the container.

Referring now to FIG. 9, in accordance with the present invention, the internal surface of at least one of the side walls 102, 104, 106 and 108 has an array 122 of holes or an array 124 of horizontal straight cuts, or both types of cuts in order to extract flavors from the wood and mature the beverage being aged, in the manner described above for the barrel staves. If necessary, all four side walls have arrays of holes and/or straight horizontal cuts, in a quantity deemed necessary to sufficiently accelerate the aging of the liquid and produce the desired taste in a relatively short period of time.

The hole pattern 122 preferably is like the hole patterns shown above for the staves of the standard barrel, as shown in FIGS. 1, 2, and 4.

The array of horizontal cuts 124 is like the arrays of horizontal cuts shown in FIGS. 1 and 3 above, except that the cuts 124 can be, closer together than the horizontal cuts for the barrels staves shown in FIGS. 1 and 3. This is because the straight side boards 102, 104, 106 and 108 need not be bent during the process of making the container, and therefore, the same stress is not put on the material around the cuts.

The number of holes and cuts necessary to produce the desired rate of aging of the liquid volume contained in the container is selected in the same way as in selecting the holes and horizontal cuts in the staves in the standard barrel described above.

The construction of the container 100 is very advantageously simple and relatively inexpensive.

As it is shown in FIGS. 8, 10 and 11, each of the edges of the boards 102, 104, 106 and 108 is beveled at a 45° angle, as shown at 118, 120 in FIG. 9. Also, each vertical edge has a tongue-and-groove structure 113, 115 shown in FIG. 11. The tongue-and-grooves fit together intimately so as to form a good seal between the side panels and minimize leakage.

Assembly also is relatively quick and simple. First, when the numbers of holes and horizontal saw cuts have been determined, and the number of boards in which the cuts will be made also have been determined, the holes are drilled with an automatic machine (a "CAD" machine), and the straight cuts can be made with ordinary saws.

The straight white-oak boards advantageously can be flat-sawed instead of quarter-sawed, it is believed, because the liquid usually will not be in the container long enough to create excessive seeping of the liquid through the wood and evaporation. This saves a substantial amount of money because flat-sawed white oak boards are much less expensive than quarter-sawed boards, and also saves wood because more flat-sawed boards can be obtained from a given tree than quarter-sawed boards.

The forming of the tongue-and-groove structures 113 and 115 is relatively simple and fast in that a single molding cutting machine can be used to form both edges of a single board in one pass.

When the side boards have been assembled together, simple stainless steel wood screws 126 are screwed into the panels near the edges in the position where they pierce both panels at the corner 111 (see FIG. 10) through the tongue-and-groove structure, thus holding the walls together in a liquid-tight construction.

In a typical example of the container 100, four white oak panels ⅞ inch thick and 28 inches long can be used to form the side walls 102, 104, 106 and 108.

Although the panels can be flat-sawed panels, quarter-sawed panels can be used, if preferred.

The grooves 121, 123, 125 and 127 into which the top wall 110 and the bottom wall 116 fit are cut, then the top and bottom walls are fitted into the grooves, and the walls are screwed together.

The capacity of the container thus formed with dimensions as stated, is approximately a little over 7 gallons. It is believed that it is practical to make the container using 8 inch wide side boards up to 8 feet long, at which size it would have a substantially increased capacity.

As it can be seen from FIGS. 8 and 9, the bottom wall 116 and the top wall 110 are recessed from the ends of the container. Thus, the bung 112, the top wall 110 and the bottom wall 116 of the container are protected when the container 100 stands on end as shown in FIG. 8 inside storage buildings where the contents are being aged.

It is believed that up to 48 of the containers having the 8×8 outside dimension can be fitted onto a standard pallet for movement by forklift truck. Shelving can be positioned on the tops of the containers, so that additional tiers of containers can be efficiently stored in a minimal amount of space.

Multi-Panel Side Walls for Rectangular Container

The container of FIG. 8 can be made with multiple panels forming each side wall 102, 104, 106 and 108. This construction is indicated schematically in FIG. 8 by the dashed lines 128 and 130 which show the seams which would be formed by two panels joined side-by-side with a tongue-and-groove construction. More than two panels per side can be used, if desired.

FIG. 12 is a cut-away view of a brace which could be used in such construction around the periphery of the container in the vicinity of the dashed line 132 shown in FIG. 8. The brace 134 includes boards 138 and 136 which are mitered at the corners and secured to the boards of the side walls by means of screws 140, 142 and 144, which are driven into the side wall boards at the edges where there are no holes or saw cuts. If desired, accordingly, the saw cuts can be limited to the centers of the boards so as to not be cut all the way to the edges of the boards.

With the foregoing techniques, the container 100 can be made to hold considerably more liquid, or considerably less, too. As an example, one-quart or one-pint sized containers can be made and used to age pre-mixed cocktails.

Although it is possible to use flavor sticks with the containers shown in FIGS. 8 through 12, it is believed that it may not be necessary to do so because of the intense amount of aging and flavor that can be imparted to the liquid with the closely-spaced side walls of the container 100.

In fact, it is believed that the maturation of the liquid, which is a separate feature apart from the extraction of flavors from the wood, is enhanced by the close spacing of side walls to one another in the rectangular containers if the invention.

It also is believed that the container shown in FIGS. 8 through 12 can be filled and emptied faster and more efficiently than standard-shaped barrels. Thus, both the container cost and the handling and storage costs can be significantly reduced by use of the invention.

Wood-Saving Embodiment

FIG. 13 shows another embodiment 150 of the container of the invent that requires far less wood than other prior barrels made entirely or mostly of wood.

The container is made of a material, other than wood, that is impervious to liquids and has good structural strength. Stainless steel is preferred, but other metals or plastics or glass can be use instead, in certain circumstances.

The container has four flat side-walls, 152, 154, 156, and 158, a top wall 194, and a bottom wall at reference numeral 168, which preferably are welded or otherwise attached to the side walls. The top wall 194 (FIG. 14) is recessed below the upper edges 160 of the side-walls by a distance higher than the top of an upstanding bung-hole structure 196 (consisting of a tube 200 and cap 198) through which the container is filled and emptied. The extensions of the upper edges 160 of the side walls protect the bung-hole structure against damage, and facilitate the stacking of the containers atop one another, as shown in FIG. 18. A groove 166 around the bottom edge of the container provides a recess into which the top edges of the side walls will fit to nest the containers so that they can be stacked atop one another with good stability.

Hand-holes are provided at 162 and 164 for use in lifting the container.

In each of the side-walls there are three elongated vertical rectangular holes 170, shown in dashed lines. Inserted through and covering each of the holes 170 is a board 172 made of a wood desirable for the process of aging a particular beverage. White oak is one of the most widely used and scarce woods at the present time.

As shown in FIGS. 15 and 16, each board has an inner surface 178 (FIG. 16) which makes contact with the liquid in the container. The board has longitudinal grooves 184 and 186 in opposite edges of the board so as to form flanges 185 and 187. The width "W" nd the length of the inner surface of the board are slightly smaller than the corresponding dimensions of the holes 170 in the side walls so that the boards can be inserted into the holes easily. A gasket 186 is provided around the periphery of each board so as to cover the flanges 185, 187 and those at the ends of the board to provide a liquid-tight seal between the board and the sidewall when the board is pressed against the side-wall. Three individual holes 180 are shown in FIG. 16.

As it is shown in FIGS. 15 and 13, each of the inner surfaces of the boards has a plurality of cross-grain cuts such as the horizontal straight cuts 176 and/or hole patterns 174, which are described in detail above. The number and type of cross-grain cuts is selected to provide the degree and speed of infusion needed for the beverage being produced. Although some of the boards may not have any cuts, most or all usually will have cuts so as to maximize the aging process.

A clamping structure is used to hold the boards 172 in place. The clamping structure consists of a plurality of threaded studs 190 secured to the outside surfaces of the side walls by welding, and a plurality of holding bars 188, some of which are shown in dashed lines in FIG. 13. The bars 188 preferably are made of steel and have holes through which the threaded studs pass. As it is shown in FIG. 17, a threaded nut 192 is threaded on to the threaded end of each stud, and is tightened to the degree necessary to make the container liquid-tight. The gasket 186 preferably is made of an alcohol-resistant sealing material such as an expanded PTFE plastic material which provides an excellent seal.

When the panels 172 have been bolted in place by use of the bars 188, the container 150 can be filled with liquid and sent to storage where the aging process is allowed to continue the beverage inside has the desired characteristics.

As shown in FIG. 18, the rectangular containers can be stacked atop one another on a support floor 202, and gain the advantages described above for rectangular wooden containers.

The wood-saving advantages of the container 150 not only include saving wood in the making of the container, but also when it is time to age a new beverage batch. Instead of discarding the old container, one merely removes the old boards and replaces them with new ones, and fills the container with the new beverage. This not only saves wood, but it saves money, because the only materials cost is the relatively low cost of the new boards. Since the boards are relative short, compared with barrel staves, some scrap wood may prove to be usable.

Although quarter-sawed oak is preferred, flat-sawed oak might be usable for the boards, as discussed above for wooden rectangular containers.

The container 150 also has an advantage over the prior use of stainless steel tanks with "flavor Sticks" in them since the wood panels 172 are exposed to the air, they "breathe" like the walls of ordinary barrels, and therefore provide good microoxygenation. This is a significant advantage in that microoxygenation is considered by many to be important in making the finest whiskeys.

Microoxygenation can be increased by reducing the thickness "T" (FIG. 16), and also by increasing the depth of the holes 180 or sawcuts 176. Conversely it can be reduced by making the cuts shallower or the thickness "T" greater.

Many variations of the foregoing can be made without departing from the invention. For example, it is within the scope of the invention to provide a frame for mounting three of the boards and applying them simultaneously to three holes 170 to speed the installation procedure. The frame would remain as part of the holding structure. Alternatively, other known clamps can be used to hold the boards firmly in place.

The invention claimed is:

1. A container for storing and aging beverages, said container comprising, in combination,
    (a) at least one liquid-impervious side wall, and a liquid-impervious bottom wall and a liquid-impervious top wall, said top wall and said bottom wall being secured to said side wall at joints made of solid liquid-impervious material,
    (b) said side wall having a plurality of spaced-apart openings, each of said openings having an area substantially less than the area of said side wall,
    (c) a plurality of wooden boards, each having a size and shape to fit into one of said openings and being fitted into one of said openings and forming a liquid-tight seal with said side wall,
    (d) a securing structure releasably holding said boards in liquid-sealing relationship to said side wall,
    (e) each of said boards having an inside surface and an outside surface when positioned in one of said openings,
    (f) said inside surface of at least one of said boards having a plurality of cross-grain cuts extending part-way through said board and being positioned to be contacted by a liquid in said container, and said outside surface being exposed to the atmosphere around said side wall.

2. A container as in claim 1 in which said side wall comprises a plurality of flat panels, each having side edges, bottom edges, and top edges, said panels being secured together at joints, said container being rectilinear in shape, said joints between said side panels being made of solid liquid impervious material.

3. A container as in claim 1 in which said cross-grain cuts are selected from the group consisting of linear cuts and holes.

4. A container as in claim 1 in which each of said boards is elongated and has a recess around its edge so as to form a flange and dimension said board to fit into one of said openings with said flange engaging said side wall.

5. A container as in claim 1 in which said side wall, said top wall and said bottom wall each is made of a liquid-impervious material selected from the group consisting of stainless steel, glass, plastic, and another liquid-impervious material.

6. A container as in claim 1 in which said side wall, said top wall and said bottom wall are made of stainless steel, said side wall comprising four stainless steel side wall panels welded together or bent to form joints of solid metal, said container being of rectilinear shape.

7. A container as in claim 1 in which said openings and said boards are elongated, and said securing structure comprises a plurality of cross-bars secured to the outside of said side wall and spanning said boards and said openings transversely of the longitudinal directions of said boards and said openings, with threaded fasteners drawing said cross-bars and said boards together so that said boards are held in sealing relationship to said openings.

8. A container for use in storing beverages, said container comprising (a) a vessel having at least one side wall, a top wall and a bottom wall, each of said walls being made of a liquid-impervious material,
(b) said side wall being secured to said top and bottom walls at liquid-impervious joints,
(c) said side wall having a plurality of openings, each having an area substantially less than the area of said side wall,
(d) a plurality of wooden panels, each sized to fill and cover one of said openings,
(e) a fastening structure for holding each of said panels against said side wall in covering relationship to one of said openings to cover and seal said opening, each of said panels having a first surface facing the inside of said vessel, and a second surface exposed to the atmosphere outside of said vessel.

9. A container as in claim 8 in which said vessel is rectilinear in shape and has four side wall panels with corners between adjacent ones of said side wall panels, each of said side wall panels having a plurality of said openings, with one of said wooden panels covering each of said openings, said corners being bent or made of fused liquid-impervious material.

10. A container as in claim 8 in which at least one of said wooden panels has a surface facing towards the interior of said vessel, and a plurality of cross-grain cuts in said surface, said cuts extending partway through the wood of said wooden panel.

11. In or for a container having a side wall made of liquid-impervious material and having multiple openings in said side wall, (a) a panel made of wood for use in aging and/or flavoring a liquid in said container, said panel being sized and shaped to cover one of said openings and maintain a seal with said side wall to inhibit leakage of said liquid around said panel,
(b) said panel having first and second broad opposed surfaces,
(c) a recess around the periphery of said first one of said broad surfaces, said recess forming a flange around the periphery of said second one of said broad surfaces,
(d) the dimensions of said first broad surface being less than those of said opening in said side wall of said container,
(e) the dimensions of said panel at said flange being greater than that of said opening so that said flange bears against the side wall of said container when it is held in place covering said opening.

12. A panel as in claim 11 in which the one of said first and second broad surfaces that is to contact said liquid in said container when said panel is installed in said opening has a plurality of cross-grain cuts extending partway through said panel.

13. A panel as in claim 11 in which the dimensions of said first broad surface are set to give clearance for a gasket between the edge of said opening and the edge of said recess.

14. A panel as in claim 12 in which said cross-grain cuts are selected from the group consisting of linear cuts and an array of holes.

* * * * *